United States Patent [19]
Yanagisawa

[11] Patent Number: 5,655,406
[45] Date of Patent: Aug. 12, 1997

[54] ROTARY MOTION DRIVE SYSTEM

[75] Inventor: Ken Yanagisawa, Matsumoto, Japan

[73] Assignee: Yugen Kaisha Sozoan, Nagano, Japan

[21] Appl. No.: 446,862

[22] PCT Filed: May 30, 1994

[86] PCT No.: PCT/JP94/00886

§ 371 Date: Jun. 5, 1995

§ 102(e) Date: Jun. 5, 1995

[87] PCT Pub. No.: WO95/00776

PCT Pub. Date: Jan. 5, 1995

[30] Foreign Application Priority Data

Jun. 28, 1993 [JP] Japan ................. 5-156803

[51] Int. Cl.⁶ .......................................... F16H 21/34
[52] U.S. Cl. ..................... 74/50; 92/68; 123/53.5; 123/197.4
[58] Field of Search ............... 74/50; 92/68; 123/53.5, 123/197.4

[56] References Cited

U.S. PATENT DOCUMENTS

| | | | |
|---|---|---|---|
| 288,007 | 11/1883 | Calver | 74/50 |
| 995,423 | 6/1911 | Ellis | 74/50 X |
| 997,190 | 7/1911 | Harvey | 74/50 X |
| 2,564,363 | 8/1951 | Horowitz et al. | 92/68 X |
| 4,995,277 | 2/1991 | Yanagisawa | 74/89.15 |

FOREIGN PATENT DOCUMENTS 1-303359  12/1989  Japan.
1-303360  12/1989  Japan.
2-35252   2/1990   Japan.
2-228590  9/1990   Japan.

*Primary Examiner*—Allan D. Herrmann
*Attorney, Agent, or Firm*—Birch, Stewart, Kolasch & Birch, LLP

[57] ABSTRACT

An object of the present invention is to provide a rotary motion drive system, which is capable of increasing the efficiency of converting the linear motion into the rotary motion. In the rotary motion drive system of the present invention, a pair of first guides are arranged parallel in a first direction. A pair of second guides are arranged parallel in a second direction perpendicular to the first direction. A first rod is arranged parallel to the first guides, the first rod is capable of keeping parallel to the first guides and moving in the second direction. A second rod is arranged parallel to the second guides, the second rod is capable of keeping parallel to the second guides and moving in the first direction. A moving body is capable of moving on the first rod and the second rod in the first direction and the second direction within a square plane, which is rounded by the first guides and the second guides. A first driving mechanism moves the second rod in the first direction. A second driving mechanism moves the first rod in the second direction. An output shaft is capable of rotating about own axis. A lever rotates the output shaft, one end of the lever is pivotably connected to the moving body, the other end of the lever is pivotably connected to one end of the output shaft, whereby the lever rotates the output shaft when the moving body moves round the output shaft.

6 Claims, 7 Drawing Sheets

ROTARY MOTION DRIVE SYSTEM

FIELD OF TECHNOLOGY

The present invention relates to a rotary motion drive system. More precisely it relates to a rotary motion drive system, which is capable of converting linear motion into rotary motion.

BACKGROUND OF THE TECHNOLOGY

There have been known a reciprocating internal combustion engine, an oil motor, etc. as the rotary motion drive system, which is capable of converting linear motion into rotary motion. In each conventional rotary motion drive system, linear motion of a piston, which is reciprocatively moved in a cylinder, is converted into rotary motion of a crank shaft.

DISCLOSURE OF THE INVENTION

The conventional reciprocating engine and the oil motor, however, have the following disadvantages.

The piston and the crank shafts are connected with a connecting rod. One end of the piston and one end of the connecting rod are pivotably connected to each other, so that they can be mutually inclined. And one end of the crank shaft and the other end of the connecting rod are also pivotably connected each other, so that they can be mutually inclined. Even if the thrust force of the piston is transmitted to the connecting rod, the thrust force cannot be perfectly transmitted to the crank shaft when the connecting rod is inclined with respect to the piston and the crank shaft. Namely, the thrust force of the piston is divided between the piston and the connecting rod, and the component force transmitted to the connecting rod is further divided between the connecting rod and the crank shaft, so that a great loss cannot be avoided. Thus, the rotary torque of the crank shaft must be smaller with respect to the thrust force of the piston, so that the efficiency of converting the linear motion into the rotary motion must be lower.

Therefore, an object of the present invention is to provide a rotary motion drive system, which is capable of increasing the efficiency of converting the linear motion into the rotary motion.

To achieve the object, the rotary motion drive system of the present invention has following constitution.

Namely, the rotary motion drive system comprises: a pair of first guides being arranged parallel in a first direction; a pair of second guides being arranged parallel in a second direction perpendicular to the first direction; a first rod being arranged parallel to the first guides, the first rod being capable of keeping parallel to the first guides and moving in the second direction; a second rod being arranged parallel to the second guides, the second rod being capable of keeping parallel to the second guides and moving in the first direction; a moving body being capable of moving on the first rod and the second rod in the first direction and the second direction within a square plane, which is rounded by the first guides and the second guides; a first driving mechanism for moving the second rod in the first direction; a second driving mechanism for moving the first rod in the second direction; an output shaft being capable Of rotating about own axis; and a lever for rotating the output shaft, one end of the lever being pivotably connected to the moving body, the other end of the lever being pivotably connected to one end of the output shaft, whereby the lever rotates the output shaft when the moving body moves round the output shaft.

Further, the rotary motion drive system may further comprise: a first parallel mechanism for keeping the first rod parallel to the first guides; and a second parallel mechanism for keeping the second rod parallel to the second guides.

In the rotary motion drive system of the present invention, one end of the lever is pivotably connected to the moving body; the other end of the lever is pivotably connected to one end of the output shaft. With this structure, the lever rotates the output shaft when the moving body moves round the output shaft. The force-transmitting-loss, which is occurred when the linear thrust force of the first rod and the second rod is converted into the rotary torque, is occurred only at the connecting point of the moving body and the lever, so the efficiency of converting the linear motion into the rotary motion can be higher.

Especially, if the rotary motion drive system has the first parallel mechanism and the second parallel mechanism, the inclination of the first rod and the second rod with respect to the first guides and the second guides, which is occurred by the movement of the moving body, are prevented by the first parallel mechanism and the second parallel mechanism, so stable rotary torque can be gained from the output shaft, especially it is more advantageous in case of having a longer lever so as to gain greater torque. Since the stable rotary torque can be gained, vibration and generating noise can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

EMBODIMENTS

Preferred embodiments of the present invention will now be described in detail with reference to the accompanying drawings.

The first embodiment will be explained with reference to FIGS. 1–3.

Figure 1:
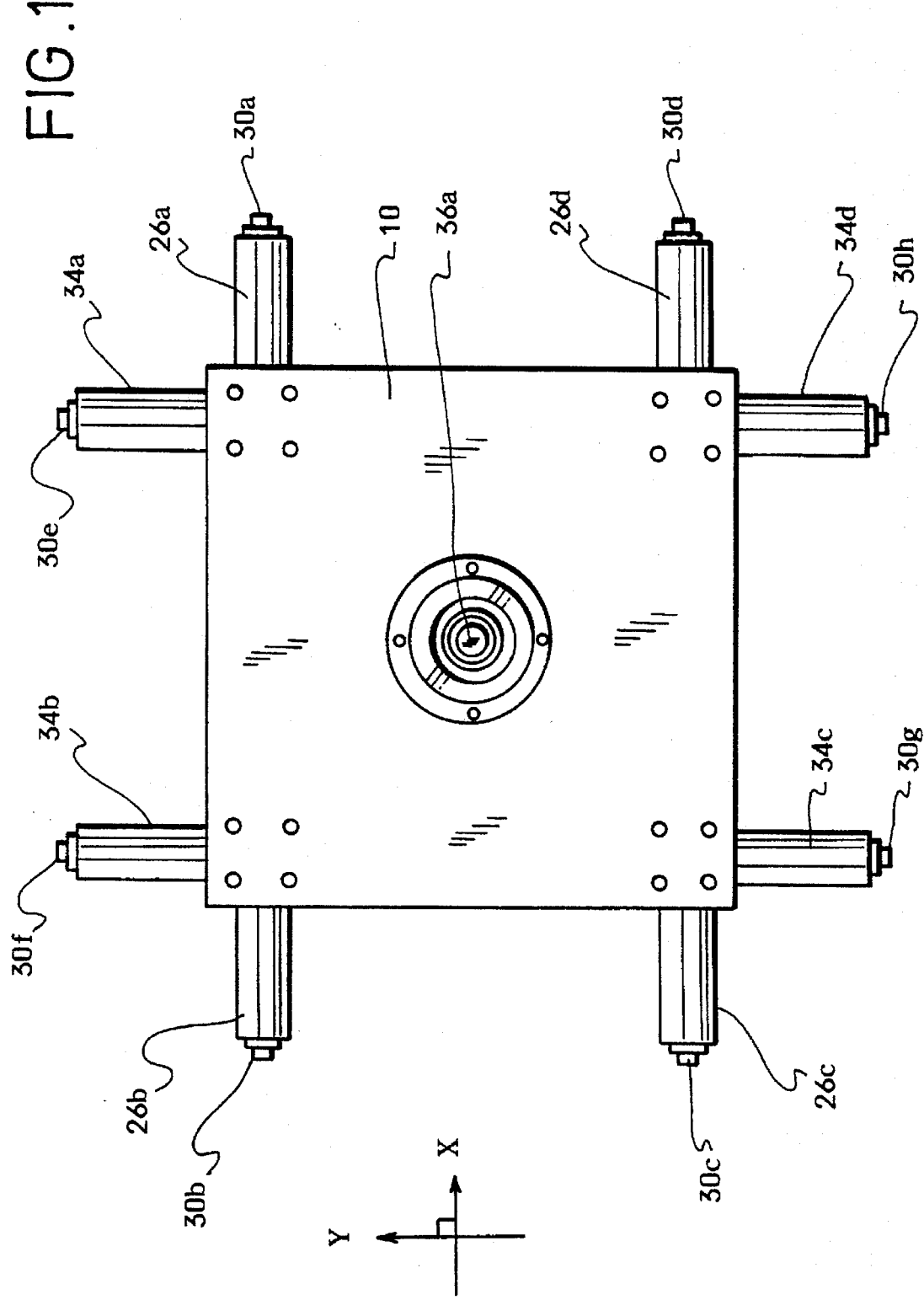
FIG. 1 is a plan view of a first embodiment of the rotary motion drive system of the present invention.

FIG. 1 is a plan view of the embodiment (note the bottom view thereof is same); FIG. 2 is a plan sectional view showing inner structure thereof; and FIG. 3 is a front sectional view thereof.

A symbol 10 is an upper cover, which is a part of a system proper; a symbol 12 is a lower cover, which is also a part of the system proper. The upper cover 10 and the lower cover 12 are connected by connecting blocks 14, which are provided at four corners.

Symbols 16a and 16b are a pair of X-guides (first guides) arranged parallel in an X-direction (first direction). The X-guides 16a and 16b are capable of moving in the X-direction, their details will be described later.

Symbols 18a and 18b are a pair of Y-guides (second guides) arranged parallel in a Y-direction (second direction). The Y-guides 18a and 18b are arranged perpendicular to the X-guides 16a and 16b. The Y-guides 18a and 18b are capable of moving in the Y-direction, their details will be described later.

A symbol 20 is an X-rod (first rod) arranged parallel to the X-guides 16a and 16b, and its ends are respectively fixed to the Y-guides 18a and 18b. Thus, the X-rod 20 is capable of moving in the Y-direction with the movement of the Y-guides 18a and 18b in the Y-direction and keeping parallel to the X-guides 16a and 16b.

A symbol 22 is a Y-rod (second rod) arranged parallel to the Y-guides 18a and 18b, and its ends are respectively fixed to the X-guides 16a and 16b. Thus, the Y-rod 22 is capable of moving in the X-direction with the movement of the X-guides 16a and 16b in the X-direction and keeping parallel to the Y-guides 18a and 18b.

A symbol 24 is a moving body, the X-rod 20 is pierced through the lower part thereof; the Y-rod 22 is pierced through the upper part thereof. The moving body 24 is capable of slidinng on the X-rod 20 and the Y-rod 22 with slide bearings in the X- and the Y-directions. With the movement of the X-rod 20 and the Y-rod 22 in X- and the Y-directions, the moving body 24 can be executed two dimensional movement in a square plane 28, which is rounded by the X-guides 16a and 16b and the Y-guides 18a and 18b.

Symbols 26a, 26b, 26c and 26d are X-cylinder units, which are one of examples of first driving mechanisms, and they are fixed to the connecting blocks 14 and arranged in the X-direction. When compressed air is charged via air-ports 30a, 30b, 30c and 30d of the X-cylinder units 26a, 26b, 26c and 26d, pistons 32a, 32b, 32c and 32d are driven. Each end of the X-guide 16a is respectively fixed to the pistons 32a and 32b, so that the X-guide 16a is moved in the X-direction by selectively charging compressed air to the X-cylinder units 26a and 26b. On the other hand, each end of the X-guide 16b is respectively fixed to the pistons 32c and 32d, so that the X-guide 16b is moved in the X-direction by selectively charging compressed air to the X-cylinder units 26c and 26d.

Symbols 34a, 34b, 34c and 34d are Y-cylinder units, which are one of examples of second driving mechanisms, and they are fixed to the connecting blocks 14 and arranged in the Y-direction. When compressed air is charged via air-ports 30e, 30f, 30g and 30h of the Y-cylinder units 34a, 34b, 34c and 34d, pistons 32e, 32f, . . . (pistons of the Y-cylinder units 34c and 34d are not shown) are driven. Each end of the Y-guide 18a is respectively fixed to the pistons 32e and the piston of the Y-cylinder unit 34d, so that the Y-guide 18a is moved in the Y-direction by selectively charging compressed air to the Y-cylinder units 34a and 34d. On the other hand, each end of the Y-guide 18b is respectively fixed to the pistons 32f and the piston of the Y-cylinder unit 34c, so that the Y-guide 18b is moved in the Y-direction by selectively charging compressed air to the Y-cylinder units 34b and 34c.

Symbols 36a and 36b are output shafts, and they are respectively rotatably attached to the upper cover 10 and the lower cover 12 with ball bearings and capable of rotating about their own axes. End sections of the output shafts 36a and 36b are projected from the upper cover 10 and the lower cover 12, so that they can be connected with driven members (not shown).

Symbols 38a and 38b are levers, and they rotate the output shafts 36a and 36b when the moving body 24 moves round the output shafts 36a and 36b. One end of the lever 36a is pivotably connected to an upper face of the moving body with a ball bearing; the other end is fixed to a lower end of the output shaft 36a. On the other hand, one end of the lever 36b is pivotably connected to a lower face of the moving body with a ball bearing; the other end is fixed to an upper end of the output shaft 36b.

Successively, the action of the rotary motion drive system will be explained.

In the present embodiment, the X-cylinder units 26a and 26d are simultaneously driven; the X-cylinder units 26b and 26c are simultaneously driven; the Y-cylinder units 34a and 34b are simultaneously driven; and the Y-cylinder units 34c and 34d are simultaneously driven. The cylinder units are controlled by a computer control unit, which controls a switching valve (not shown) for selectively charging compressed air supplied from a compressor, not shown.

Figure 2:
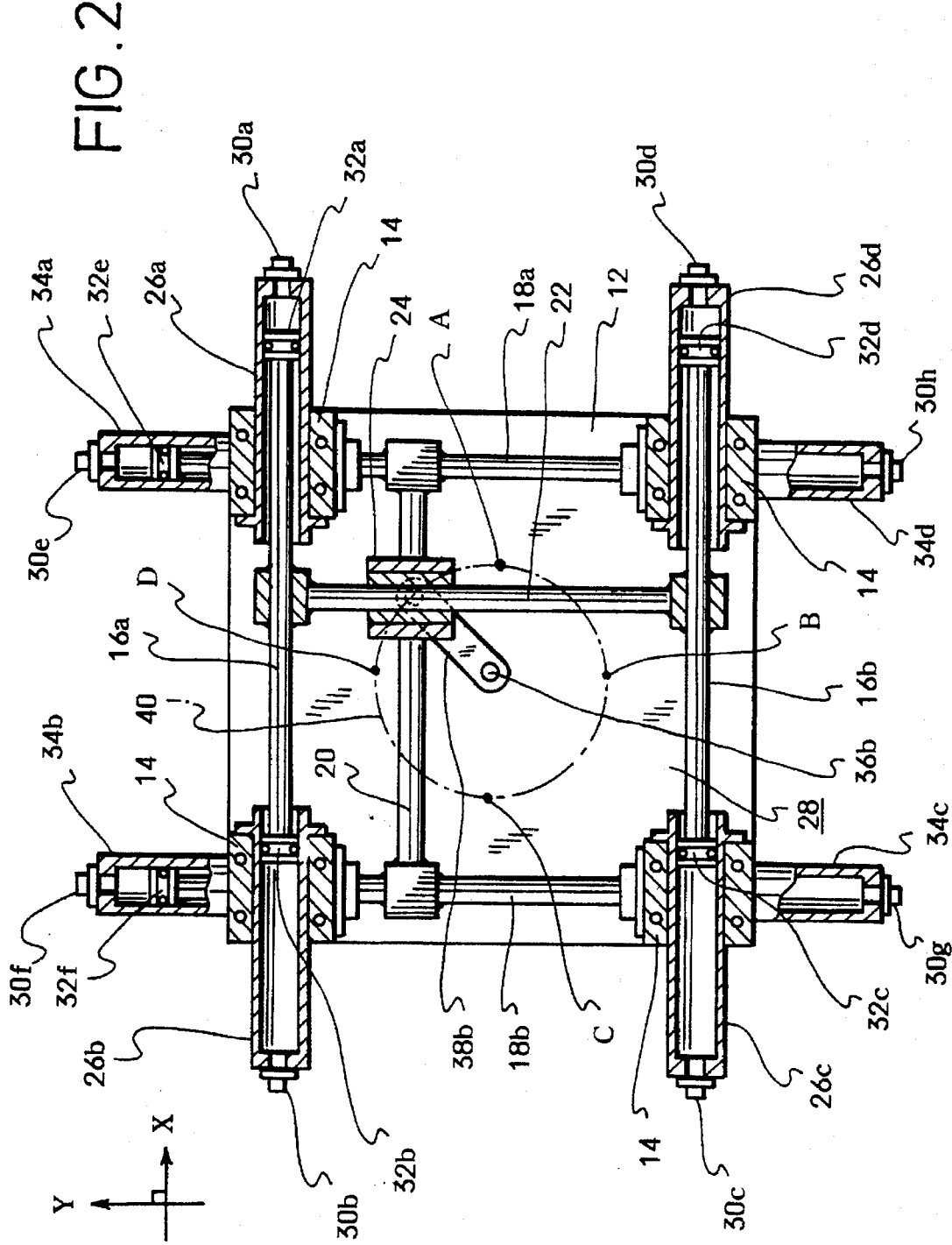
FIG. 2 is a plan sectional view of the system shown in FIG. 1.
Figure 3:
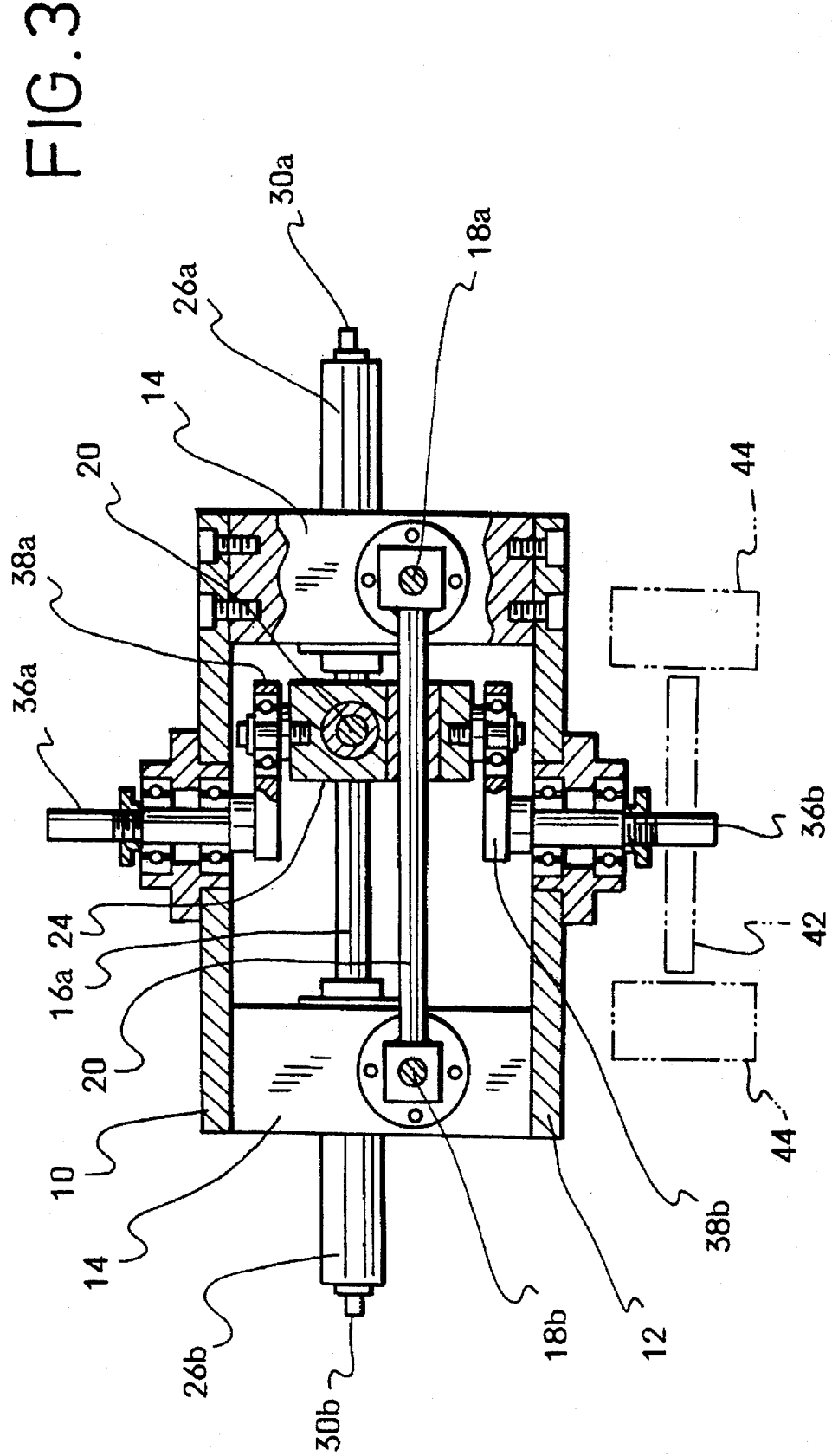
FIG. 3 is a front sectional view of the system shown in FIG. 1.

In FIG. 2, for example, when compressed air is charged to the X-cylinder units 26b and 26c and the Y-cylinder units 34a and 34b, X-guides 16a and 16b and the Y-rod 22 are biased rightward in the X-direction; the Y-guides 18a and 18b and the X-rod 20 are biased downward in the Y-direction. But the output shafts 36a and 36b are able to rotate but unable to move their positions, so that the moving body 24, which is connected with the output shafts 36a and 36b by the levers 38a and 38b, is moved in the clockwise direction from the present position to a position A.

At the position A, when compressed air is continuously charged to the Y-cylinder units 34a and 34b; charging compressed air to the X-cylinder units 26b and 26c is stopped; and compressed air is charged to the X-cylinder units 26a and 26d, the Y-guides 18a and 18b and the X-rod 20 are biased downward in the Y-direction; the X-guides 16a and 16b and the Y-rod 22 are biased leftward in the X-direction. Thus, the moving body 24 is moved in the clockwise direction from the position A to a position B.

At the position B, when compressed air is continuously charged to the X-cylinder units 26a and 26d; charging compressed air to the Y-cylinder units 34a and 34b is stopped; and compressed air is charged to the Y-cylinder units 34c and 34d, the X-guides 16a and 16b and the Y-rod 22 are biased leftward in the X-direction; the Y-guides 18a and 18b and the X-rod 20 are biased upward in the Y-direction. Thus, the moving body 24 is moved in the clockwise direction from the position B to a position C.

At the position C, when compressed air is continuously charged to the Y-cylinder units 34c and 34d; charging compressed air to the X-cylinder units 26a and 26d is stopped; and compressed air is charged to the X-cylinder units 26b and 26c, the Y-guides 18a and 18b and the X-rod 20 are biased upward in the Y-direction; the X-guides 16a and 16b and the Y-rod 22 are biased rightward in the X-direction. Thus, the moving body 24 is moved in the clockwise direction from the position C to a position D.

By repeating above described actions, the moving body 24 can be continuously moved along an orbit 40, so that the output shafts 36a and 36b are continuously rotated in the clockwise direction. With this rotation, the driven member or members, which are connected with the output shafts 36a and/or 36b, can be rotated. Note that, in case of rotating the output shafts 36a and 36b in the counterclockwise direction, the X-cylinder units 26a, 26b, 26c and 26d and the Y-cylinder units 34a, 34b, 34c and 34d are driven in the reverse order.

During the operation, the inertia is generated by the orbital movement of the moving body 24 round the output shafts 36a and 36b, and a short time is necessary for the X-cylinder units 26a, 26b, 26c and 26d and the Y-cylinder units 34a, 34b, 34c and 34d to charge and discharge compressed air, so that actual switching positions, at which compressed air is charged to or discharged from the X-cylinder units 26a, 26b, 26c and 26d and the Y-cylinder units 34a, 34b, 34c and 34d, must be set slightly before the positions A, B, C and D. To detect the switching positions, a timing plate 42, for example, is fixed to the output shaft 36b, which actuates a micro switch 44 so as to send detecting signals to the computer control unit when the timing plate rotates predetermined angle. Besides the timing plate 42 and the micro switch 44, any means for detecting the switching positions, e.g., a rotary encoder, can be employed as the detecting means.

In the rotary motion drive system of the present embodiment, the rotation of the output shafts 36a and 36b is stopped by stopping charging compressed air to the X-cylinder units and the Y-cylinder units. By stopping the air charge, the movement of the X-guides 16a and 16b or the Y-guides 18a and 18b is stopped, so that the orbital movement of the moving body 24 and the rotation of the output shafts 36a and 36b are stopped.

In the present embodiment, a pair of X-guides 16a and 16b (or a pair of Y-guides 18a and 18b) are simultaneously driven by two X-cylinder units 26a and 26d or two X-cylinder units 26b and 26c (or two Y-cylinder units 34a and 34b or two Y-cylinder units 34c and 34d), so that the X-guides 16a and 16b (or the Y-guides 18a and 18b) can be simultaneously moved in the same direction and in the same length. Therefore, vibration of the system and generating noise can be prevented, further stable high speed operation can be executed.

As described above, when the moving body 24 moves from the position shown in FIG. 2 toward the position B via the position A, for example, the states of the X-cylinder units and the Y-cylinder units are changed between the air-charging status and the air-discharging status shortly before reaching the position A. When the moving body is close to the position A, the moving length in the X-direction is quite short, so the inertia smoothly affects the moving body 24 without shock even if said status is changed between the air-charging status and the air-discharging status. Therefore, the moving body 24 can be moved round stably. Especially it is advantageous when the moving body 24 is moved round at high speed.

In the present embodiment, the linear motion of the X-guides 16a and 16b and the Y-guides 18a and 18b in the X- and the Y-directions are converted into the orbital movement of the moving body 24, then the orbital movement is further converted into the rotation of the output shafts 36a and 36b by the levers 38a and 38b, so that the force-transmitting-loss is occurred only at the connecting point of the moving body 24 and the levers 38a and 38b, and the efficiency of converting the linear motion or the linear thrust force of the X-guides 16a and 16b and the Y-guides 18a and 18b into the rotary motion or the rotary torque of the output shafts 36a and 36b can be higher.

The rotary motion drive system of the present embodiment has a simple mechanical structure, so the change of the size of the system, which has been very difficult for the conventional rotary motion drive systems, e.g., a reciprocating engine, an oil motor, can be easily executed. Especially the rotary torque of the output shafts 36a and 36b can be controlled by merely adjusting the length of the levers 38a and 38b, so that various rotary torque can be gained from one system.

Figure 4:
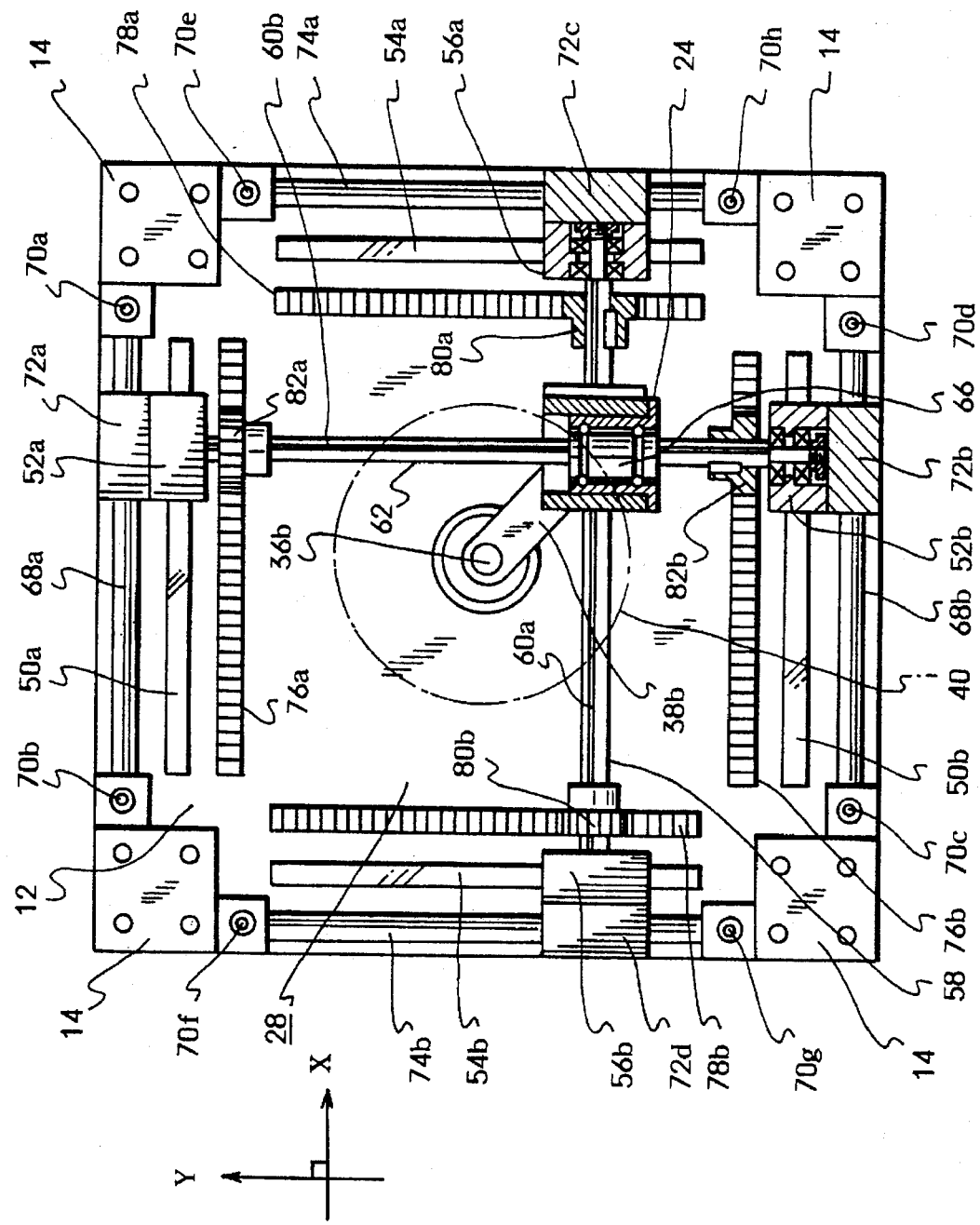
FIG. 4 is a plan sectional view of a second embodiment of the rotary motion drive system.
Figure 5:
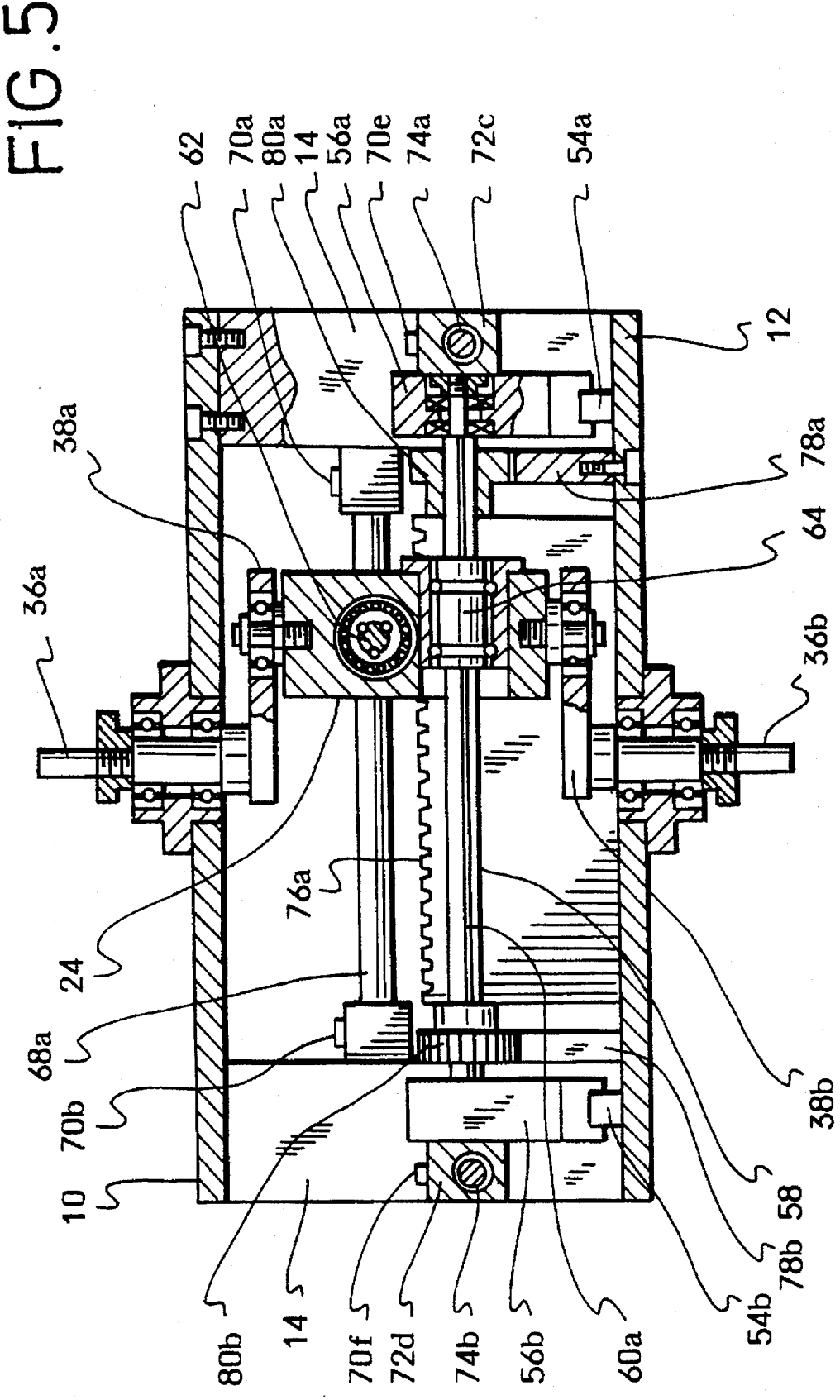
FIG. 5 is a front sectional view of the system shown in FIG. 4.

The second embodiment will be explained with reference to FIGS. 4 and 5. Note that, elements which have been described in the first embodiment are assigned the same symbols and explanation of these symbols will be omitted.

In the first embodiment, if the X-rod 20 and the Y-rod 22 are long, by the movement of the moving body 24, the position in the Y-direction of the one end of the X-rod 20 is apt to shift with respect to that of the other end thereof; the position in the X-direction of the one end of the Y-rod 22 is apt to shift with respect to that of the other end thereof. Then, the rotary motion drive system of the second embodiment has a first parallel mechanism for keeping the X-rod parallel to the X-guides and a second parallel mechanism for keeping the Y-rod parallel to the Y-guides.

Firstly, the constitution of the system will be explained.

Symbols 50a and 50b are a pair of X-guides (the first guides), which are arranged parallel in the X-direction (the first direction). The X-guides 50a and 50b are linear guides, which are fixed on an upper face of the lower cover 12. X-moving blocks 52a and 52b are capable of respectively sliding on the X-guides 50a and 50b.

Symbols 54a and 54b are a pair of Y-guides (the second guides), which are arranged parallel in the Y-direction (the second direction). The Y-guides 54a and 54b are arranged perpendicular to the X-guides 50a and 50b. The Y-guides 54a and 54b are also linear guides, which are fixed on the upper face of the lower cover 12. Y-moving blocks 56a and 56b are capable of respectively sliding on the Y-guides 54a and 54b.

Each end of an X-rod 58 (the first rod) is rotatably connected to each of Y-moving blocks 56a and 56b with a bearing. There are grooved three spline grooves 60a, which are formed in the longitudinal direction, on an outer circumferential face of the X-rod 58.

Each end of a Y-rod 62 (the second rod) is rotatably connected to each of X-moving blocks 52a and 52b with a bearing. There are grooved three spline grooves 60b, which are formed in the longitudinal direction, on an outer circumferential face of the Y-rod 62.

There is provided an X-rotor 64, which is capable of rotating about its own axis, in a lower part of the moving body 24. The X-rod 58 is pierced through the X-rotor 64; the X-rotor 64 is engaged with the spline grooves 60a. With this structure, the X-rotor 64 is capable of moving on the X-rod 58 in the X-direction and rotating about own axis together with the X-rod 58. On the other hand, there is provided a Y-rotor 66, which is capable of rotating about its own axis, in an upper part of the moving body 24. The Y-rod 62 is pierced through the Y-rotor 66; the Y-rotor 66 is engaged with the spline grooves 60b. With this structure, the Y-rotor 66 is capable of moving on the Y-rod 62 in the Y-direction and rotating about own axis together with the Y-rod 62.

Symbols 68a and 68b are X-rodless cylinder units, which are one of examples of the first driving mechanism, and they are spanned in the X-direction between the connecting blocks 14. By charging compressed air to air-ports 70a, 70b, 70c and 70d of the X-rodless cylinder units 68a and 68b, sliders 72a and 72b are moved on the X-rodless cylinder units 68a and 68b in the X-direction. The slider 72a is connected to the X-moving block 52a; the slider 72b is connected to the X-moving block 52b. Thus, the Y-rod 62 and the moving body 24 are moved in the X-direction by selectively charging compressed air to the X-rodless cylinder units 68a and 68b.

Symbols 74a and 74b are Y-rodless cylinder units, which are one of examples of the second driving mechanism, and they are spanned in the Y-direction between the connecting blocks 14. By charging compressed air to air-ports 70e, 70f, 70g and 70h of the Y-rodless cylinder units 74a and 74b, sliders 72c and 72d are moved on the Y-rodless cylinder units 74a and 74b in the Y-direction. The slider 72c is connected to the Y-moving block 56a; the slider 72d is connected to the Y-moving block 56b. Thus, the X-rod 58 and the moving body 24 are moved in the Y-direction by selectively charging compressed air to the Y-rodless cylinder units 74a and 74b.

Symbols 76a and 76b are X-racks, which are fixed on the upper face of the lower cover 12 and arranged parallel in the X-direction.

Symbols 78a and 78b are Y-racks, which are fixed on the upper face of the lower cover 12 and arranged parallel in the Y-direction.

Symbols 80a and 80b are Y-pinions, each of which is fixed at each end of the X-rod 58. The Y-pinions 80a and 80b are respectively engaged with the Y-racks 78a and 78b. When the X-rod 58 is moved in the Y-direction, the Y-pinions 80a and 80b roll on the Y-racks 78a and 78b. During the rotation, the X-rod 58 is rotated together with the Y-pinions 80a and 80b. While the X-rod 58 is moved, even if external force works the X-rod 58 to incline with respect to the X-axis, the X-rod 58 is kept parallel to the X-guides 50a and 50b because the Y-pinions 80a and 80b engage with the Y-racks 78a and 78b. Namely, the Y-racks 78a and 78b and the Y-pinions 80a and 80b role as the first parallel mechanism.

Symbols 82a and 82b are X-pinions, each of which is fixed at each end of the Y-rod 62. The X-pinions 82a and 82b are respectively engaged with the X-racks 76a and 76b. When the Y-rod 62 is moved in the X-direction, the X-pinions 82a and 82b roll on the X-racks 76a and 76b. During the rotation, the Y-rod 62 is rotated together with the X-pinions 82a and 82b. While the Y-rod 62 is moved, even if external force works the Y-rod 62 to incline with respect to the Y-axis, the Y-rod 62 is kept parallel to the Y-guides 54a and 54b because the X-pinions 82a and 82b engage with the X-racks 76a and 76b. Namely, the X-racks 76a and 76b and the X-pinions 82a and 82b role as the second parallel mechanism.

In the rotary motion drive system of the second embodiment, the Y-rod 62 and the moving body 24 can be moved in the X-direction by simultaneously charging compressed air to the air-ports 70a and 70d, or the air-ports 70b and 70c of the X-rodless cylinder units 68a and 68b. On the other hand, the X-rod 58 and the moving body 24 can be moved in the Y-direction by simultaneously charging compressed air to the air-ports 70e and 70f, or the air-ports 70h and 70g of the Y-rodless cylinder units 74a and 74b. In the present embodiment too, the X-rodless cylinder units 68a and 68b and the Y-rodless cylinder units 74a and 74b are controlled by the computer control unit, which controls the switching valve (not shown) for selectively charging compressed air supplied from the compressor. In the second embodiment, any means for detecting the switching positions of the X-rodless cylinder units 68a and 68b and the Y-rodless cylinder units 74a and 74b (the timing plate and the micro switch, the rotary encoder, etc.) may be employed as the detecting means as well as the first embodiment.

In the second embodiment too, the output shafts 36a and 36b are rotated about their own axes by moving the moving body 24 round the output shafts 36a and 36b. Since the system of the second embodiment has the first and the second parallel mechanisms, the inclination of the X-rod 58 and the Y-rod 62 with respect to the X-guides 50a and 50b and the Y-guides 54a and 54b can be prevented even if working points of the external force, which causes said inclination, on the X-rod 58 and the Y-rod 62 is changed with the movement of the moving body 24, so that vibration of the system and generating noise can be prevented and stable rotary torque can be gained from the output shafts 36a and 36b. Especially the system will be more advantageous in case of having long levers 38a and 38b so as to get greater rotary torque.

Figure 6:
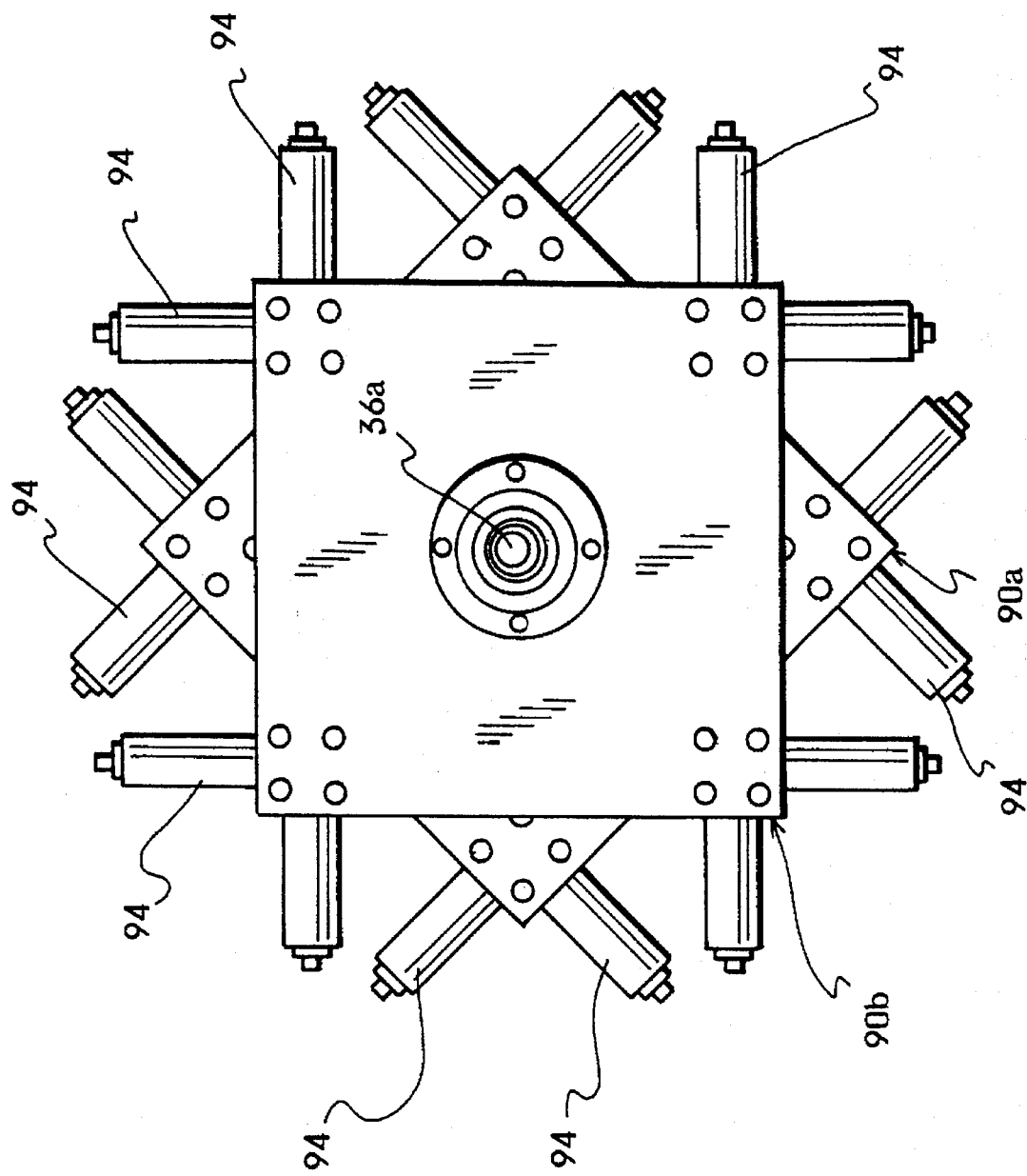
FIG. 6 is a plan view of a third embodiment of the rotary motion drive system.
Figure 7:
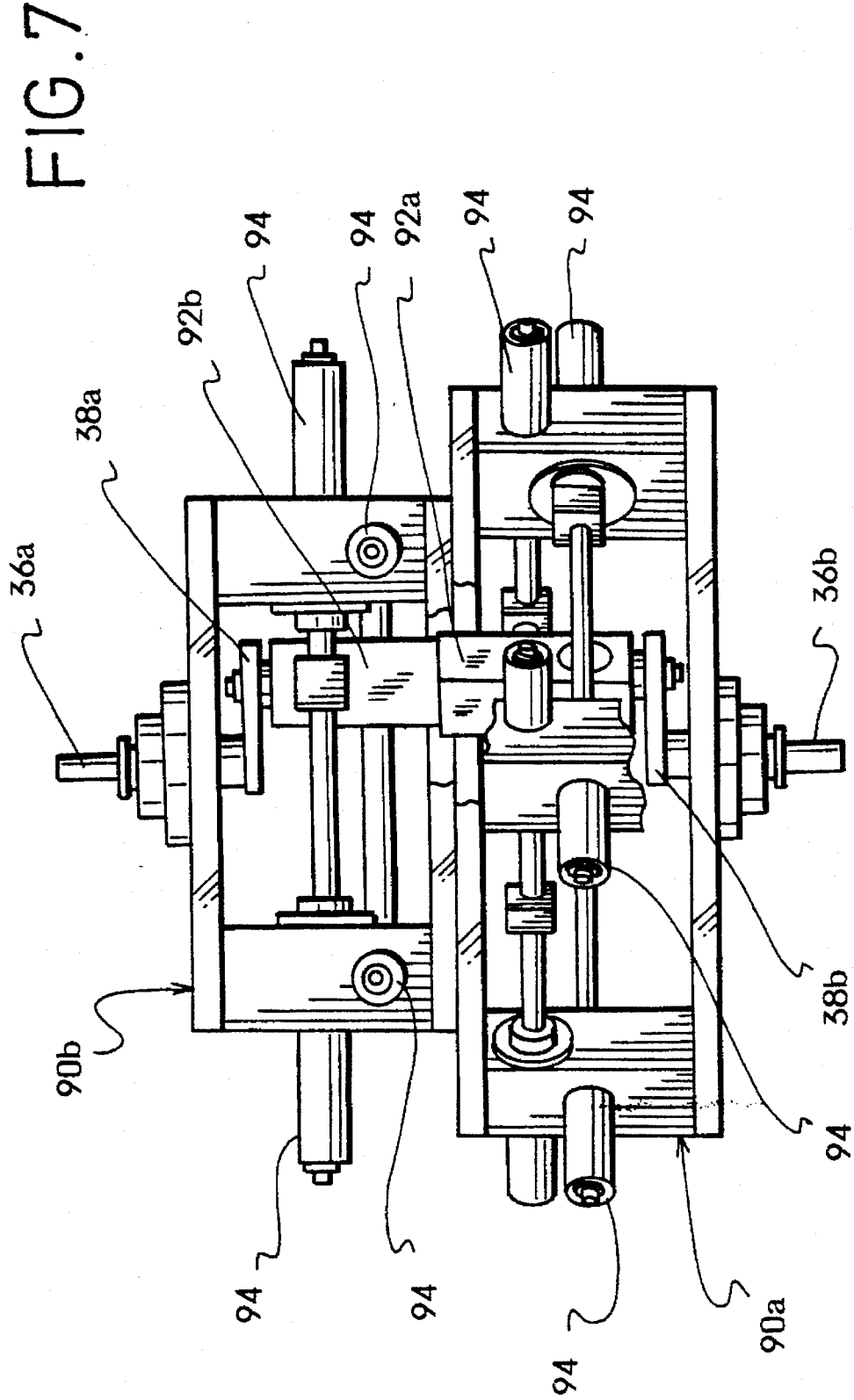
FIG. 7 is a front view of the system shown in FIG. 6.

The third embodiment will be explained with reference to FIGS. 6 and 7.

The rotary motion drive system of the third embodiment is a combination of a plurality of sub-rotary motion drive systems, each of which is the rotary motion drive systems of the first embodiment.

The system shown has a couple of sub-rotary motion drive systems 90a and 90b, which are vertically connected to each other. The sub-systems 90a and 90b are mutually shifted with angle of 45° in a plane. A moving body 92a of the sub-system 90a and a moving body 92b of the sub-system 90b are mutually connected, so that the both are capable of moving together.

In the third embodiment, the rotary motion drive system has 16 air cylinder units 94, and two of them are simultaneously driven so as to move the moving bodies 92a and 92b round the output shafts 36a and 36b, so that the rotary motion (the rotary torque) can be gained from the output shafts 36a and 36b.

By combining a plurality of the sub-systems 90a and 90b as disclosed in the third embodiment, multiple switching points of the air cylinder units 94 can be set, so that stable torque can be gained and the moving bodies 92a and 92b can be stably moved round. With the stable operation, vibration of the system can be reduced, so the system is advantageous for high speed operation. Further, by combining a plurality of the sub-systems 90a and 90b, the total output torque can be greater.

In case of combining a plurality of the sub-systems 90a and 90b, the moving bodies 92a and 92b may be connected integrally, and the output shafts may be mutually connected by a coupler, etc.

Preferred embodiments of the present invention have been described in detail but the present invention is not limited to above described embodiments, the first driving mechanism and the second driving mechanism, for example, are not limited to the air cylinder units or the rodless cylinder units, other linear motion means, e.g., a hydraulilc cylinder unit, a linear motor, a solenoid unit, an internal-combustion engine with a linear motion piston, can be employed, namely many modifications can be allowed without deviating the spirit of the invention.

I claim:

1. A rotary motion drive system, comprising:
   a pair of first guides being arranged parallel in a first direction;
   a pair of second guides being arranged parallel in a second direction perpendicular to the first direction;
   a first rod being arranged parallel to said first guides, said first rod being capable of keeping parallel to said first guides and moving in the second direction;
   a second rod being arranged parallel to said second guides, said second rod being capable of keeping parallel to said second guides and moving in the first direction;
   a moving body being capable of moving on said first rod and said second rod in the first direction and the second direction within a square plane, which is rounded by said first guides and said second guides;
   a first driving mechanism for moving said second rod in the first direction;
   a second driving mechanism for moving said first rod in the second direction;
   an output shaft being capable of rotating about its own axis; and
   a lever for rotating said output shaft, one end of said lever being pivotably connected to said moving body, the other end of said lever being pivotably connected to one end of said output shaft, whereby said lever rotates said output shaft when said moving body moves round said output shaft.

2. The rotary motion drive system according to claim 1, further comprising:
   a first parallel mechanism for keeping said first rod parallel to said first guides; and
   a second parallel mechanism for keeping said second rod parallel to said second guides.

3. The rotary motion drive system according to claim 1, wherein said first driving mechanism and said second driving mechanism are air cylinder units.

4. The rotary motion drive system according to claim 2, wherein said first parallel mechanism and said second parallel mechanism are rack-pinion mechanisms.

5. The rotary motion drive system according to claim 1, wherein a plurality of sets of said outputs shafts and said levers are provided.

6. The rotary motion drive system according to claim 3, further comprising:
   means for detecting switching positions of said air cylinder units at which an air-charging status and an air-discharging status of said air cylinder units are changed.

* * * * *